Aug. 31, 1965      A. MONTENARE      3,203,723

PNEUMATICALLY CUSHIONED BUMPER

Filed July 10, 1962      2 Sheets-Sheet 1

*INVENTOR*
ANTHONY MONTENARE

BY *Mason, Mason & Albright*
                      ATTORNEYS

Aug. 31, 1965   A. MONTENARE   3,203,723
PNEUMATICALLY CUSHIONED BUMPER
Filed July 10, 1962   2 Sheets-Sheet 2
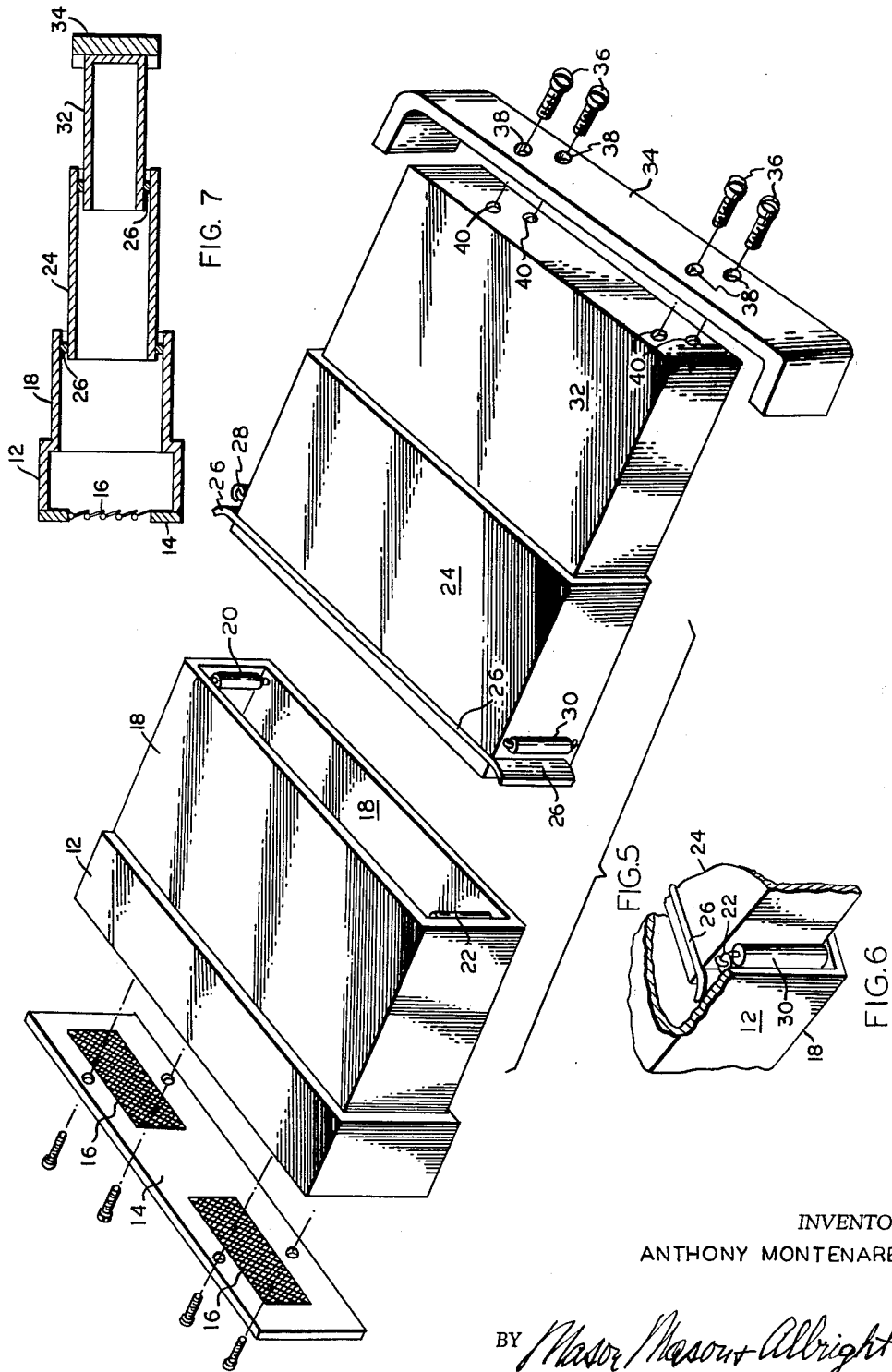
INVENTOR
ANTHONY MONTENARE
BY Mason, Mason & Albright
ATTORNEYS

United States Patent Office 3,203,723
Patented Aug. 31, 1965

3,203,723
PNEUMATICALLY CUSHIONED BUMPER
Anthony Montenare, 326 N. 4th St., Reading, Pa.
Filed July 10, 1962, Ser. No. 208,709
6 Claims. (Cl. 293—89)

This invention relates to a combined bumper and cushioning device to be applied to automotive vehicles for preventing injury to the occupants of the vehicle and to the vehicle itself.

An object of the invention is to provide a bumper which relies on fluid to cushion the force of impact, should the vehicle come into contact with a foreign object.

Another object is to provide a cushion of air, which air is compressed when the bumper comes into contact with a foreign object.

An additional object is to provide a bumper having a plurality of relatively movable sections that are capable of moving relative to each other, whereby to compress air trapped within the several sections.

A further object is the provision of collapsible air-containing sections having means for trapping and compressing air within the sections when the vehicle comes into contact with a foreign object.

Other objects will appear hereinafter throughout the specification.

Figure 1:
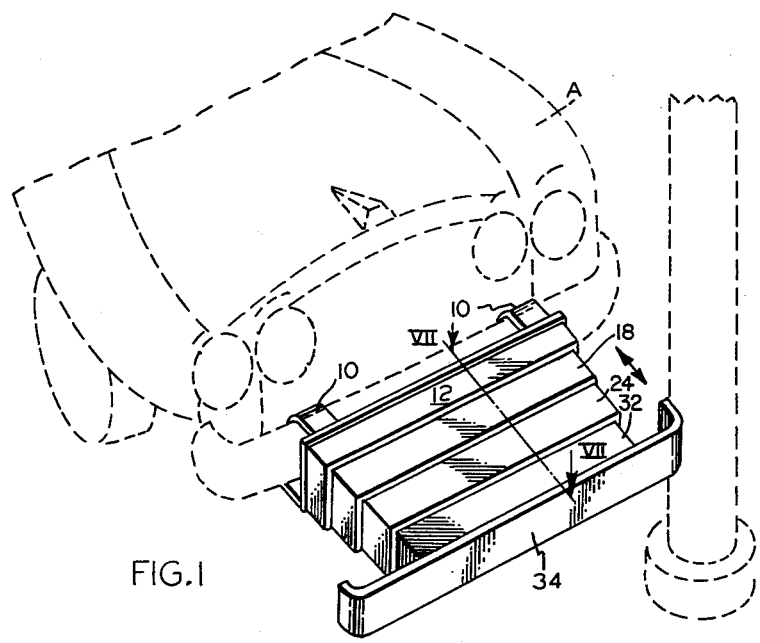
Figure 2:
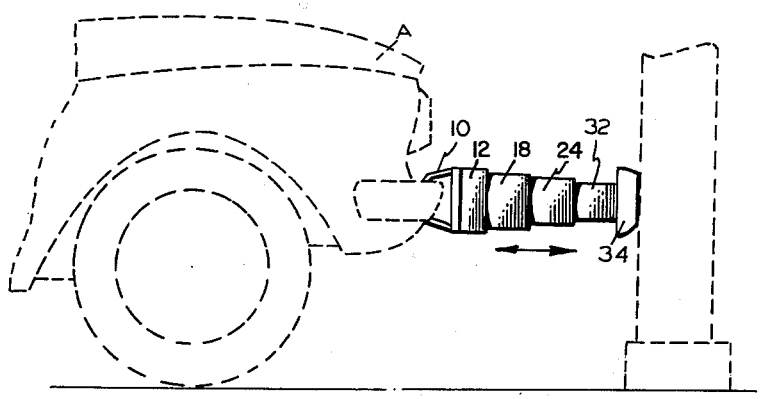
Figure 3:
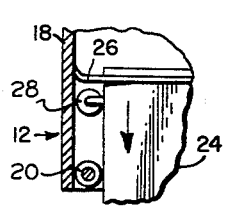
Figure 4:
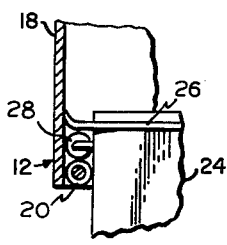

In the drawings:
FIGURE 1 is a perspective view of the bumper in place on a motor vehicle, the latter being shown in dotted lines;
FIGURE 2 is a side elevation of the structure shown in FIGURE 1;
FIGURE 3 is a fragmentary plan view, partly in section, showing a part of the bumper in retracted position;
FIGURE 4 is a similar figure, showing the parts in extended position;
FIGURE 5 is an exploded view of the several parts of the device of the invention;
FIGURE 6 is a perspective view, partly broken away, showing in detail the connection of the parts when in extended position; and
FIGURE 7 is a sectional view taken on a sectional line VII—VII longitudinally with respect to the axis of the vehicle of the buffer assembly in FIGURE 1.

It will be understood that the device hereinafter to be described may be applied to either end or to both ends of an automotive vehicle, such as an automobile, a truck, or other similar vehicle.

Referring to the drawings, it will be noted that applicant's invention comprises a plurality of hollow, telescopic casings which are rectangular in cross-section, one to be telescoped within another. Any number of said sections may be used. Preferably, these sections and the parts appurtenant thereto are composed of metal, although other materials may be used.

As will be seen by referring to FIGURES 1 and 2, the device may be readily attached to a conventional bumper of an automotive vehicle and, as heretofore stated and although not shown, one of the devices may be mounted on the front bumper and a second device, mounted on the rear bumper, so as to protect the automotive vehicle and its occupants from injury, or at least serious injury, during a collision with a foreign object.

As shown, the bumper-cushioning device of this invention may be mounted on the bumper of an automotive vehicle A, as shown in FIGURES 1 and 2, by means of suitable brackets 10. These brackets are attached to the rear section of the box-like buffer member 12. It will be noted that the rear end of this member is closed by the panel 14, shown in detail in FIGURE 5. This panel member is provided with a pair of flap valves 16, and the forward end 18 of the section 12 is open, as shown in FIGURE 5. Mounted adjacent the side edges of the forward end 18 and in the mouth of the opening formed thereby are a pair of spaced rollers 20 and 22.

A smaller middle section 24 is adapted to fit within the confines of the rear section 12. All four sides of the middle section adjacent the lower end thereof, as viewed in FIGURE 5, are provided with sealing strips 26 which are of such dimensions as to engage the inner surface of section 12 when the middle panel is moved back and forth within this rear section.

Located forwardly and closely adjacent to the sealing strips 26 on the sides of the middle section are rollers 28 and 30. There is a third or a forward section 32 which is adapted to telescope within the section 24 in the same manner as the section 24 telescopes within the section 12. The forward end of the section 24 is provided with rollers (not shown) the same as rollers 20 and 22 of section 12, and section 32 is also provided with rollers and sealing strips similar to the rollers 26 and sealing strips 30 of section 24. The forward end of section 32 may be provided with a bumper or guard 34 which is held in place by screws, rivets or other suitable attaching means illustrated somewhat diagrammatically by the screws 36 and openings 38 and threaded openings 40.

Any number of sections corresponding to sections 12, 24 and 32 may be used but, preferably, it is desired that these sections, when extended as shown in FIGURES 1 and 2, do not extend more than two or, at the most, three feet in front of the conventional bumper of a motor vehicle.

As noted above, the pair of flap valves 16 are of a fairly light material, but are of such weight, however, that, when the several sections are forced inwardly to collapse the same, as when striking a foreign object, air is trapped within the several sections and forms a cushion to absorb the shock of impact with said object. However, when the several sections are manually again pulled out to their full length, the flap valves permit the entry of air into the spaces of the several rectangular sections. These flap valves are preferably attached by rivets or cement, or both, along the top edges (not shown) of the openings which they cover.

The above description and drawings disclose a single embodiment of the invention, and specific language has been employed in describing the several figures. It will be understood, however, that no limitations of the scope of the invention are thereby contemplated and that various alterations and modifications may be made such as would occur to one skilled in the art to which the invention relates.

I claim:
1. An automotive bumper and cushioning device, comprising a bumper having an elongated width and a plurality of hollow, air-filled telescoping sections telescoped individually into each other, said telescoping sections having elongated widths, means for attaching the rearmost of said sections to a motor vehicle, said bumper being mounted on the foremost of said sections, the width of each of said sections extending substantially parallel and substantially across the width of said bumper and each of said sections being of substantially the same configuration in cross section, means for sealing the outer sides of one of said sections against the inner sides of the section in which it is adapted to telescope and substantially pneumatically sealing the interior of said device.

2. The structure of claim 1, wherein at least one of said sections is provided with antifriction bearing means.

3. The structure of claim 1, wherein one of said sections is provided with antifriction rollers adjacent the iner open end thereof, and another of said sections is provided with antifriction roller means on the outer side edges thereof.

4. The structure of claim 3, wherein said sealing means is located between the inner and outer antifriction rollers of said sections.

5. The structure of claim 3, wherein one of said sections is provided with an end panel, and valve means in said end panel constituting at least part of said means for sealing the interior of said bumper.

6. The structure of claim 3, wherein one of said sections is provided with an end panel having opening means, and flap valve means located in said opening means constituting at least part of said means for sealing the interior of said bumper.

References Cited by the Examiner

UNITED STATES PATENTS

| | | | |
|---|---|---|---|
| 1,420,065 | 6/22 | Stillman | 293—62 X |
| 1,517,724 | 12/24 | Giuliana | 293—86 |
| 1,528,617 | 3/25 | Klotz | 293—86 X |
| 1,570,624 | 1/26 | Dominguez | 293—86 X |
| 1,853,886 | 4/32 | Schmidt | 213—24 |
| 1,914,479 | 6/33 | Brooks | 213—36 |
| 2,829,915 | 4/58 | Claveau | 293—71 |
| 3,014,710 | 12/61 | Layne. | |

MILTON BUCHLER, *Primary Examiner.*

JAMES S. SHANK, LEO QUACKENBUSH, *Examiners.*